United States Patent
Kovac

(10) Patent No.: US 7,029,219 B2
(45) Date of Patent: Apr. 18, 2006

(54) DEVICE, ASSEMBLY, AND METHOD FOR HOLDING A PIECE IN A BORE

(75) Inventor: Zdravko Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 31 days.

(21) Appl. No.: 10/629,572

(22) Filed: Jul. 30, 2003

(65) Prior Publication Data

US 2004/0109742 A1    Jun. 10, 2004

Related U.S. Application Data

(60) Provisional application No. 60/399,704, filed on Aug. 1, 2002.

(51) Int. Cl.
*F16B 43/02* (2006.01)

(52) U.S. Cl. ....................... 411/353; 411/999
(58) Field of Classification Search ................. 44/339, 44/512, 353, 499; 16/2.1–2.5
See application file for complete search history.

(56) References Cited

U.S. PATENT DOCUMENTS

| | | | |
|---|---|---|---|
| 1,409,606 A * | 3/1922 | Stendahl ..................... 411/353 |
| 1,499,071 A | 6/1924 | Pleister |
| 1,697,814 A * | 1/1929 | Forbes ........................ 16/2.1 |
| 1,800,578 A * | 4/1931 | Webb ......................... 403/50 |
| 2,339,187 A * | 1/1944 | Pain ........................... 248/314 |
| 2,676,508 A | 4/1954 | Erickson |
| 2,931,412 A | 4/1960 | Wing |
| 3,137,195 A | 6/1964 | Rosenberg, Jr. |
| 4,534,101 A | 8/1985 | Rosan, Jr. |
| 4,640,479 A * | 2/1987 | Shely et al. ................. 248/56 |
| 4,685,173 A * | 8/1987 | Pavur ........................... 16/2.2 |
| 4,750,878 A | 6/1988 | Nix et al. |
| 4,787,790 A | 11/1988 | Shirai |
| 5,188,495 A | 2/1993 | Jones, Jr. |
| 5,395,194 A | 3/1995 | Johnson et al. |
| 5,462,395 A * | 10/1995 | Damm et al. ............... 411/107 |
| 5,518,349 A | 5/1996 | Holub et al. |
| RE36,164 E | 3/1999 | Johnson et al. |
| 5,890,861 A | 4/1999 | Kaiser et al. |
| 6,039,525 A | 3/2000 | Johnson |
| 6,267,421 B1 | 7/2001 | Burton |
| 6,280,132 B1 * | 8/2001 | Szczukowski et al. ....... 411/353 |
| 6,359,224 B1 * | 3/2002 | Beele ......................... 174/65 G |
| 6,409,446 B1 * | 6/2002 | Schwarz ...................... 411/552 |
| 6,478,519 B1 * | 11/2002 | Genick, II .................. 411/353 |
| 6,623,226 B1 * | 9/2003 | Braun et al. ................ 411/353 |
| 6,705,369 B1 * | 3/2004 | Russell et al. .............. 152/427 |

FOREIGN PATENT DOCUMENTS

| | | |
|---|---|---|
| FR | 2 431 057 | 3/1980 |
| GB | 855297 | 11/1960 |
| GB | 1006010 | 9/1965 |

* cited by examiner

*Primary Examiner*—Flemming Saether
(74) *Attorney, Agent, or Firm*—Miles & Stockbridge P.C.

(57) ABSTRACT

A device for holding a piece in a bore comprises a cylindrical sleeve constructed to be inserted into the bore and held therein by engagement of its outer surface with an inner surface of the bore, and an annular bead extending circumferentially and inwardly from the inner surface of the sleeve, the bead being disposed to engage an outer surface of a piece inserted into the sleeve. The sleeve and the bead are integrally formed of resilient flexible plastic.

22 Claims, 3 Drawing Sheets

DEVICE, ASSEMBLY, AND METHOD FOR HOLDING A PIECE IN A BORE

CROSS-REFERENCE TO RELATED APPLICATION

This application claims the benefit of application Ser. No. 60/399,704 filed Aug. 1, 2002 incorporated herein by reference.

BACKGROUND OF THE INVENTION

This invention relates to a device, assembly, and method for holding a piece, such as a fastener, in a bore. The invention will be described in its application to fastener retainers, but it will become apparent that the invention has broader utility.

The use of fastener retainers to pre-attach bolts, studs, or other fasteners to a workpiece, such as a panel, in preparation for a subsequent assembly operation is well known. In a typical general application, a bolt (or other fastener) is inserted into a plastic annular retainer which is designed to retain the bolt within a smooth-walled bore of a workpiece. The retainer, which has an outer diameter slightly larger than that of the bore, is pressed into the bore, where it is held by resilient frictional engagement with the bore wall, thus pre-attaching the bolt to the workpiece. The workpiece may subsequently be associated with a second workpiece having a threaded bore which is axially aligned with the bore of the first workpiece, and the two workpieces may then be securely assembled to each other by engaging the bolt with the threaded bore of the second workpiece. See, for example, U.S. Pat. Nos. RE 36,164 and 6,039,525.

In a typical specific application, to minimize manual labor on an engine assembly line where oil pans are attached by bolts to engine blocks, fastener retainers can be used to pre-attach bolts to the oil pan, and the assembly of the oil pan and the bolts in their retainers can be moved to an assembly line for attachment to an engine block. Such pre-attachment improves production efficiency by eliminating the need for manual placement of the fasteners as parts of the engine assembly operation.

In using fastener retainers, it is often important that the holding power of the retainer to the fastener and the holding power of the retainer to the workpiece bore be such that the retained fastener may, if inadvertently bumped, slide axially of the retainer without the retainer slipping out of the workpiece bore. It is also desirable to provide a retainer that accommodates misalignment of bores and that permits the fastener to be tilted relative to the axis of the retainer. Furthermore, it is desirable that the design of the retainer readily accommodate varying requirements for retainer holding power and varying fastener and bore diameters, and that the retainer be capable of being manufactured simply and economically.

SUMMARY OF THE INVENTION

It is an object of the present invention to provide an improved device, assembly, and method for holding a piece in a bore, and more particularly, to provide an improved fastener retainer and method of using the retainer.

It is another object of the invention to provide a device of the foregoing type that is readily adaptable to varying requirements for holding power and that is capable of being manufactured simply and economically.

It is a further object of the invention to provide a unique spacer or washer.

The foregoing objects, as well as other aspects, features and advantages of the invention, will be more fully appreciated from the following description of preferred embodiments taken in conjunction with the accompanying drawings.

DESCRIPTION OF THE PREFERRED EMBODIMENTS

Figure 1:
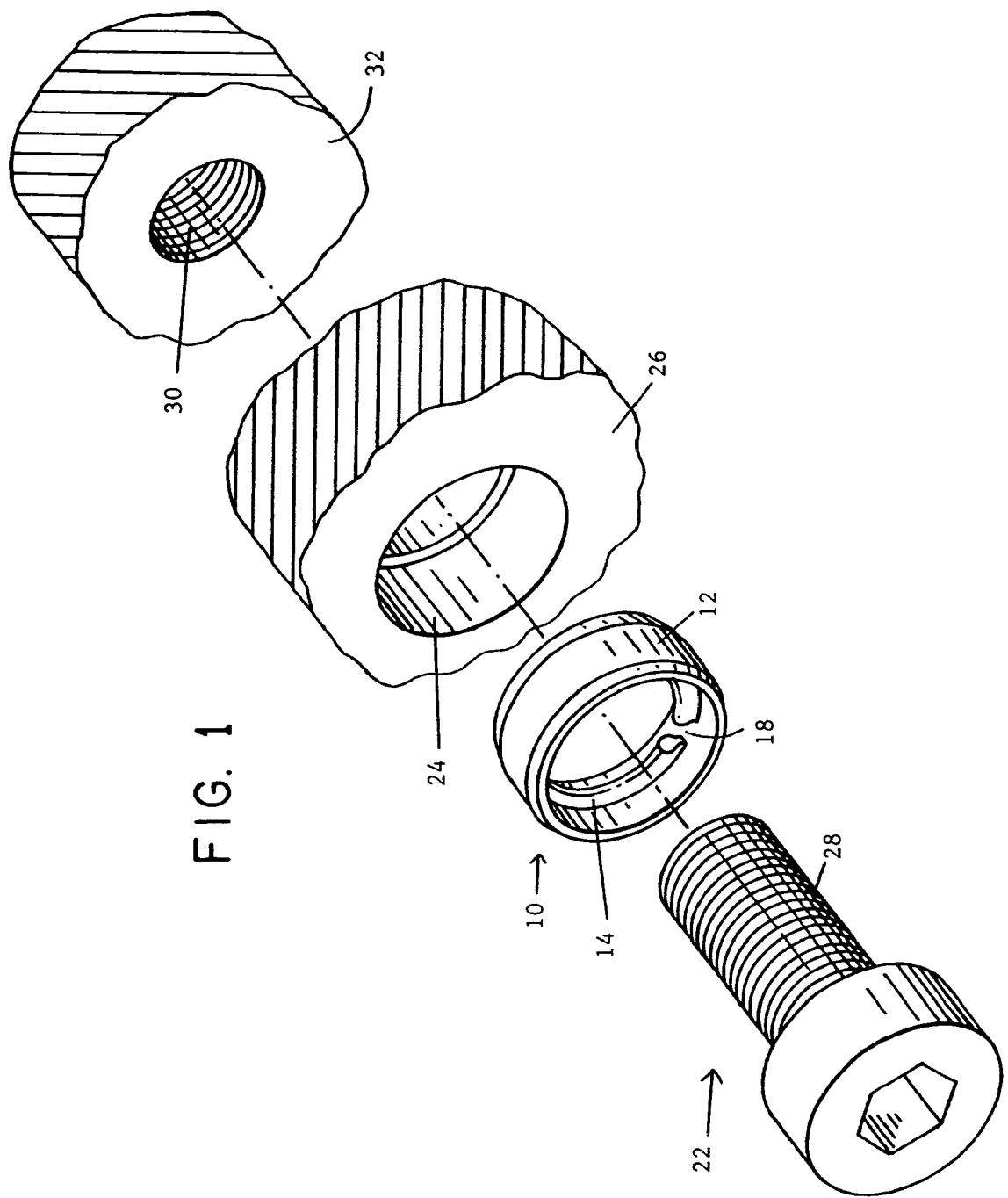
FIG. 1 is an exploded perspective view showing the use of an assembly of the invention including a piece-holding device, e.g., a bolt retainer, and a piece to be held, e.g., a bolt.
Figure 2:
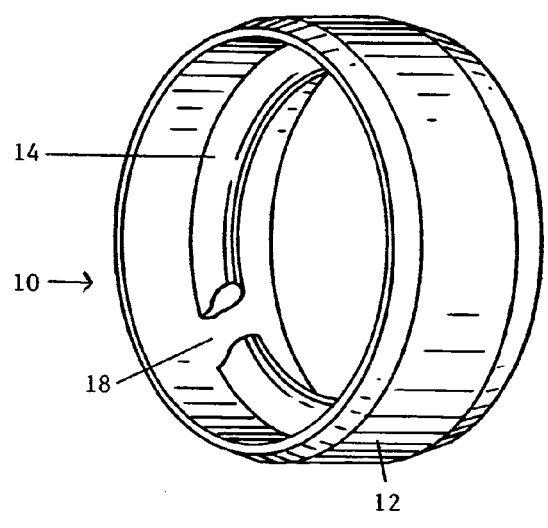
FIG. 2 is a perspective view of a piece-holding device according to the invention.
Figure 3:
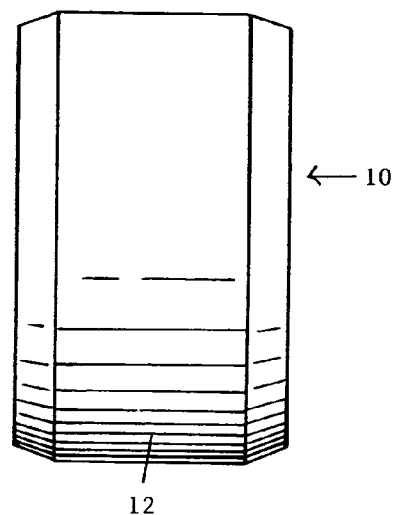
FIG. 3 is a side elevation view of the piece-holding device.
Figure 4:
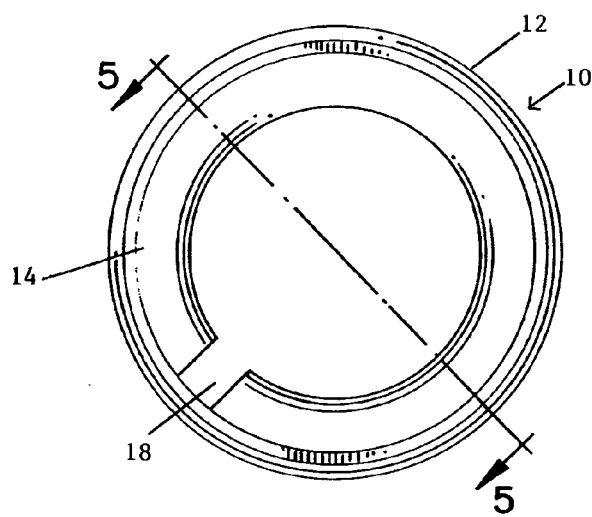
FIG. 4 is an end view of the piece-holding device.

As shown in FIGS. 1–5 an embodiment of a device 10 according to the invention comprises a cylindrical sleeve 12, preferably chamfered at its opposite ends, as shown. A fastener engaging structure is constituted by a single internal bead or rib 14 extending circumferentially of the sleeve. The bead may be formed as a bulge directly on a central portion of the inner surface of the sleeve or may be connected to the inner surface by an intervening thin web 16 which allows the bead 14 to be resiliently displaced more easily. To provide additional flexibility to the bead structure, a slit 18 may be formed along the circumferential length of the bead. If desired, a plurality of bead sections may be formed by providing a plurality of such slits.

The sleeve 12 and the bead 14 are integrally formed of a resilient flexible plastic, such as a polyester elastomer. For example, the sleeve and the bead can be manufactured by injection molding of a plastic such as high density polyethylene.

Figure 5:
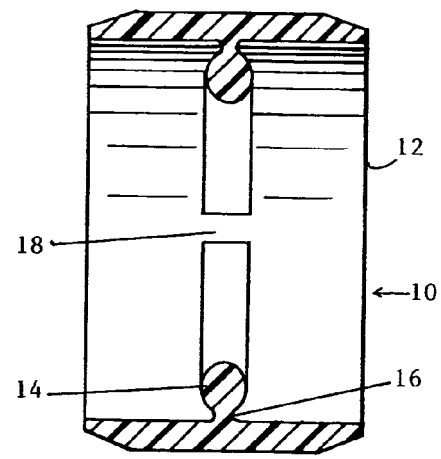
FIG. 5 is a sectional view taken along line 4-4 in FIG. 4.
Figure 6:
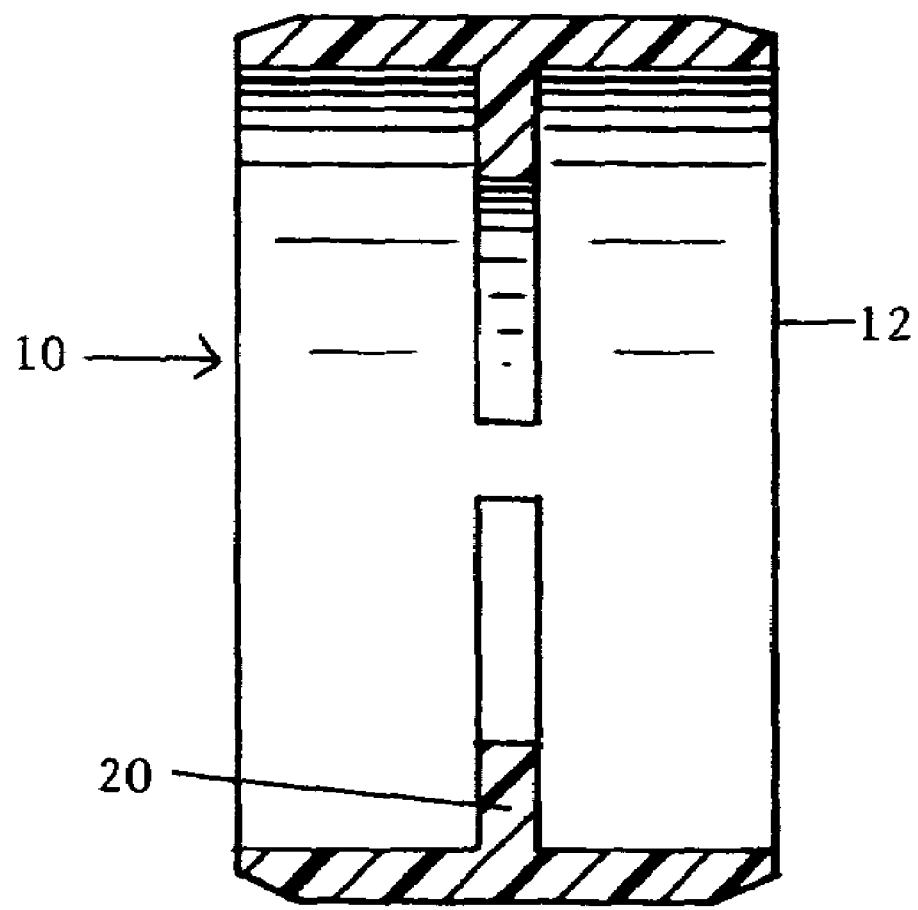
FIG. 6 is a similar sectional view of a modification.

In one embodiment, the bead is of substantially circular or oval cross-section, as shown in FIG. 5, while in another embodiment, the bead is of substantially rectangular cross section, as shown by bead 20 in FIG. 6. The innermost portion of the bead defines an inner diameter which is slightly smaller than an outer diameter of the shank of a fastener to be used with the retainer. Upon insertion of the fastener into the sleeve, from either end, the shank (e.g., thread crests in the case of a bolt) engages the bead and displaces the bead slightly axially and outwardly. The bead resiliently presses against the fastener shank to hold the fastener within the retainer. The holding power of the retainer to the fastener can readily be designed as desired by appropriately selecting the configuration and dimensions of the bead and/or the web at the interface of the bead and the inner surface of the sleeve.

FIG. 1 illustrates the use of a retainer 10 of the invention (representative of the use of all embodiments) for holding a bolt 22 in a bore 24 of a body 26. Typically, the retainer 10 will be pre-assembled with the bolt 22, and the resulting assembly will then be inserted into and frictionally engaged with the bore 24 of the body 26, thus pre-attaching the bolt to the body. However, the retainer may first be pressed into the bore and then the bolt inserted into the retainer.

The outer diameter of the sleeve 12 is slightly greater than the inner diameter of the bore 24 to allow for resilient frictional engagement of the sleeve with the wall of the bore. The diameters of the outer surface of the sleeve and the bore wall are preferably sufficiently close to one another to avoid buckling of the sleeve within the bore, whereby essentially the entirety of the cylindrical outer surface of the sleeve between the chamfered ends will be in engagement with the opposed cylindrical inner surface of the bore.

When the shank 28 of the bolt 22 is pressed into the retainer 10, the outer surface of the shank (typically the crests of the threads in the case of a bolt) engages the bead 14 and thereby deflects the bead axially and slightly outwardly. As a result, the bead centers the bolt within the sleeve of the retainer and holds the bolt within the retainer. As is apparent in FIG. 1, the bolt 22 may project from the bore 24 of the body 26 for engagement with a threaded bore 30 of a second body 32, thereby to join the second body 32 to the first body 26. The bodies may be panels to be joined, for example.

The construction of the invention accommodates misalignment of the bolt 22 and the retainer 10 as well as misalignment of the bodies 26 and 32 to be joined. It is preferred that the frictional force between the outer surface of the sleeve 12 of the retainer 10 and the inner surface of the bore 24 be greater than the frictional force between the bolt 22 and the retainer 10, so that adjustment of the bolt relative to the retainer does not shift the retainer relative to the bore. Mechanical characteristics of the plastic material of the retainer and the design of the retainer must provide enough strength to keep the bolt securely in the body 26 in which the bolt 22 and the retainer 10 are inserted.

While preferred embodiments of the invention have been shown and described, those skilled in the art will recognize that various changes can be made without departing from the principles and spirit of the invention, the scope of which is defined in the appended claims. For xample, a device 10 of the invention may be used as a spacer or a washer and may be used in multiples to provide a group of such devices spaced apart for holding a pin or stud in a long bore.

What is claimed is:

1. A device for holding a piece in a bore, comprising:
    a cylindrical sleeve having substantially identical chamfered opposite ends and constructed to be inserted into the bore with either end leading and to be held therein by engagement of its outermost surface with an inner surface of the bore, the sleeve having a longitudinal cross-section in which a cylindrical wall thickness of the sleeve is defined by outermost and innermost substantially parallel lines and the chamfered ends are defined by lines that slope from ends of the outermost line toward the innermost line; and
    an annular bead inside the sleeve extending circumferentially and inwardly from a location on the inner surface of the sleeve that is substantially equi-distant from the opposite ends of the sleeve and having an exposed innermost surface to engage an outer surface of a piece inserted in the sleeve
    wherein the sleeve and the bead are integrally formed of resilient flexible plastic.

2. A device according to claim 1, wherein the bead has a circular or oval cross-section.

3. A device according to claim 1, wherein the bead has a rectangular cross-section.

4. A device according to claim 1, wherein the bead is connected to the inner surface of the sleeve by a web that is thinner than the bead in longitudinal cross-section of the sleeve.

5. A device according to claim 1, wherein the bead has at least one slot interrupting its circumference.

6. A device according to claim 1, wherein the bead is hinged to the inner surface of the sleeve.

7. A method of holding a piece in a bore of a body comprising:
    providing a piece-holding device having a cylindrical sleeve with substantially identical chamfered opposite ends and constructed to be inserted into the bore with either end leading, and to be held therein by engagement of its outermost surface with an inner surface of the bore, the sleeve having a longitudinal cross-section in which a cylindrical wall thickness of the sleeve is defined by outermost and innermost substantially parallel lines and the chamfered ends are defined by lines that slope from ends of the outermost line toward the innermost line, and having an annular bead extending circumferentially and inwardly from a location on an inner surface of the sleeve that is substantially equi-distant from the opposite ends of the sleeve and having an exposed innermost surface to engage an outer surface of a piece inserted into the sleeve, the sleeve and the bead being integrally formed of resilient flexible plastic;
    inserting a piece in the sleeve of the piece-holding device so that the outer surface of the piece engages the bead; and
    inserting the piece-holding device in the bore so that the outermost surface of the sleeve engages the inner surface of the bore.

8. A method, according to claim 7, wherein the piece is inserted in the piece-holding device and then the device and the piece are inserted in the bore.

9. A method according to claim 7, wherein the piece-holding device is inserted in the bore and then the piece is inserted in the device.

10. A method according to claim 7, wherein the bead is provided with at least one slot interrupting its circumference.

11. A method according to claim 7, wherein the bead is connected to the inner surface of the sleeve by a web that is thinner than the bead in longitudinal cross-section of the sleeve.

12. A method according to claim 7, wherein the bead is hinged to the inner surface of the sleeve.

13. An assembly including a piece to be held in a bore and a device in which the piece is inserted for holding a the piece in the bore, wherein the device comprises:
    a cylindrical sleeve having substantially identical chamfered opposite ends and constructed to be inserted in the bore with either end leading, and to be held therein by engagement of its outermost surface with an inner surface of the bore, the sleeve having a longitudinal cross-section in which a cylindrical wall thickness of the sleeve is defined by outermost and innermost substantially parallel lines and the chamfered ends are defined by lines that slope from ends of the outermost line toward the innermost line; and
    and an annular bead inside the sleeve extending circumferentially and inwardly from a location on the inner surface of the sleeve that is substantially equi-distant from the opposite ends of the sleeve and having an exposed innermost surface to engage an outer surface of a piece inserted in the sleeve, wherein the sleeve and the bead are integrally formed of resilient flexible plastic.

14. An assembly according to claim 13, wherein the piece is a bolt.

15. An assembly according to claim 13, wherein the bead is connected to the inner surface of the sleeve by a web that is thinner than the bead in longitudinal cross-section of the sleeve.

16. An assembly according to claim 13, wherein the bead is hinged to the inner surface of the sleeve.

17. In combination, a body having a bore therein, a piece-holding device inserted in the bore, and a piece inserted and held by the piece-holding device, wherein the piece-holding device comprises:

a cylindrical sleeve having substantially identical chamfered opposite ends and constructed to be inserted into the bore with either end leading, and to be held therein by engagement of its outermost surface with an inner surface of the bore, the sleeve having a longitudinal cross-section in which a cylindrical wall thickness of the sleeve is defined by outermost and innermost substantially parallel lines and the chamfered ends are defined by lines that slope from ends of the outermost line toward the innermost line;

and an annular bead inside the sleeve extending circumferentially and inwardly from a location on an inner surface of the sleeve that is substantially equi-distant from the opposite ends of the sleeve and having an exposed innermost surface to engage an outer surface of a piece inserted in the sleeve, wherein the sleeve and the bead are integrally formed of resilient flexible plastic.

18. A combination according to claim 17, wherein the bead has a circular or oval cross-section.

19. A combination according to claim 17, wherein the bead has a rectangular cross-section.

20. A combination according to claim 17, wherein the bead is connected to the inner surface of the sleeve by a web that is thinner than the bead in longitudinal cross-section of the sleeve.

21. A combination according to claim 17, wherein the bead has at least one slot interrupting its circumference.

22. A combination according to claim 17, wherein the bead is hinged to the inner surface of the sleeve.

* * * * *